Aug. 10, 1965 D. L. WHITE 3,200,354

ULTRASONIC WAVE TRANSMISSION DEVICE UTILIZING SEMICONDUCTOR PIEZOELECTRIC MATERIAL TO PROVIDE SELECTABLE VELOCITY OF TRANSMISSION

Filed Nov. 17, 1961

INVENTOR
D. L. WHITE
BY Roy M. Porter, Jr.
ATTORNEY

United States Patent Office 3,200,354
Patented Aug. 10, 1965

3,200,354

ULTRASONIC WAVE TRANSMISSION DEVICE UTILIZING SEMICONDUCTOR PIEZOELECTRIC MATERIAL TO PROVIDE SELECTABLE VELOCITY OF TRANSMISSION

Donald L. White, Mendham, N.J., assignor to Bell Telephone Laboratories, Incorporated, New York, N.Y., a corporation of New York Filed Nov. 17, 1961, Ser. No. 153,088
10 Claims. (Cl. 333—30)

This invention relates to acoustic wave transmission devices, and more particularly to devices in which the velocity of propagation of an ultrasonic, acoustic wave is readily varied to produce variable ultrasonic delay lines, fixed and variable ultrasonic filters, ultrasonic modulators, and similar devices.

Ultrasonic devices, such as delay lines, take advantage of the fact that the velocity of propagation of a mechanical vibration or an acoustic wave is much lower than that of electrical signals by transforming the electrical signal into the ultrasonic wave, sending the ultrasonic wave down a mechanical path of predetermined length and composition, and reconverting the wave into an electrical signal at the far end. The amount of delay in a typical medium is determined by the physical length of the delay path and the velocity of sound. In most delay line structures this delay time can be adjusted only by changing the physical length of the line or by changing the velocity of sound by changing the temperature of operation. A delay line in which the velocity of sound is readily adjustable by electrical means would allow the same delay line to have a continuously adjustable delay time without physically changing the line. If the variation can be made fast enough, the line may be used to modulate ultrasonic energy.

It is, therefore, an object of the present invention to vary the velocity of propagation of an ultrasonic acoustic wave in its transmission medium.

It is a more specific object to electrically vary the delay time in an ultrasonic delay medium.

It has been previously recognized by the present inventor and by others that the velocity of propagation of an acoustic wave in a medium that is piezoelectric depends upon the resistivity of the media. The present invention takes unique advantage of one way in which the resistivity, and, therefore, the ultrasonic velocity of at least a portion of the delay medium may be varied. In particular, a delay medium is provided which includes in the delay path one or more depletion layers formed at a non-ohmic contact in semiconductive, piezoelectric material. The depletion layer is a region in a semiconductor in which the charge carriers normally present in the material have been swept out by an electric field. Since there are no carriers in the depletion layer region, the material behaves as if it were of high resistivity, and the velocity of sound in the region is therefore higher than it is in the normal semiconductor from which the depletion layer was formed. By electrically varying the depth of the layer, the delay of the path may be electrically varied. In certain embodiments to be described the layer extends longitudinally along the delay path and in other embodiments it extends transversely across the path. In a further embodiment a plurality of layers are disposed successively along the path and by electrically varying their spacing, novel and useful, frequency selective characteristics are obtained.

The present invention utilizes properties of materials that are both semiconductive and piezoelectric. It is only recently that piezoelectric effects have been observed in most of the materials here contemplated because they are generally too conductive to support an electrical field large enough to produce a piezoelectric response. It is nevertheless a characteristic of the depletion layer utilized by the present invention that even though the bulk semiconductor is too conductive to produce a piezoelectric response, the carrier population in the depletion layer has been reduced to a degree that the layer becomes sufficiently non-conductive to support a piezoelectric field. This property is found in the group III–V and II–VI semiconductors.

The above-mentioned objects, the nature of the present invention, its various advantages and features will appear more fully upon consideration of the following detailed description taken in connection with the drawings in which.

Figure 1:
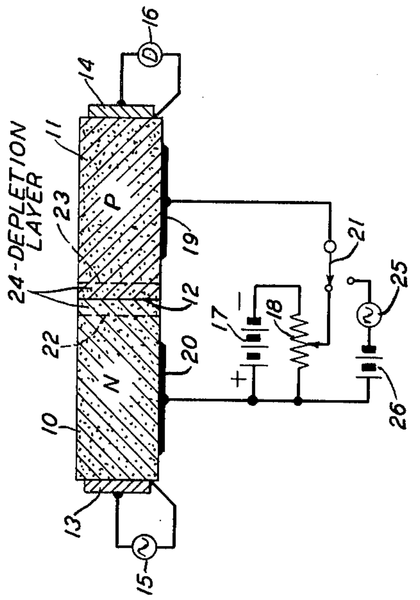
FIG. 1 is a representation, partly in schematic and partly in longitudinal cross-section, of an ultrasonic delay line employing a transversely extending depletion layer in accordance with the invention.

Referring more particularly to FIG. 1, a section of delay line in accordance with the invention is shown interposed between ultrasonic transducers 13 and 14. Transducer 13 converts the electrical signals from source 15 into acoustical vibrations for travel down the line to transducer 14 which converts the acoustical energy into electrical signals to be delivered to utilizing device 16. These components are all conventional in the art and no further consideration need be given to them. The delay line itself comprises a section 10 of low resistivity, n-type, semiconductive material and a second section 11 of low resistivity, p-type, semiconductor material. Preferably, sections 10 and 11 are formed of a single crystal and the sections make intimate contact along the interface junction 12 which extends transversely with respect to the direction of propagation of the wave along the line. The materials of sections 10 and 11 may comprise one of the group III–V or II–VI compounds that are piezoelectric in a high resistivity form. Preferred materials are GaAs, GaP, GaSb, InAs, InSb, BP, properly stabilized AlP, AlAs, AlSb from group III–V, and CdS, ZnS, ZnO, CdSe, ZnSe and MgTe from group II–VI. The basic composition of the sections may be the same as or different from each other. The material of section 10 has been rendered n-type by the inclusion of any suitable donor impurity and the material of section 11 has been rendered p-type by the inclusion of any suitable acceptor impurity. Examples of typical donor impurities known to the art are sulphur and selenium for the group III–V compounds and indium and chlorine for the group II–VI compounds. Typical acceptor impurities are zinc and cadmium. The details of fabricating such a junction are well known in the semiconductor art and form no part of the present invention. The junction may be formed by the techniques known as crystal pulling, rate-growing, epitaxial depositing, alloying or diffusion.

However formed, junction 12 is back-biased (positive potential applied to the n-type element) by a variable direct current source illustrated by battery 17 and potentiometer 18, connected to the junction by suitable ohmic contacts 19 and 20. The switch 21, included in the bias circuit, will be considered hereinafter.

When a p-n junction is biased in this direction, the mobile charge carriers (holes in the p material and free electrons in the n material) are pulled away from the junction to form what is referred to in the semiconductor art as a depletion layer. This layer is represented schematically on the drawing by reference numeral 24 designating the volume between the dotted lines 22 and 23. The thickness of the layer physically increases as the bias voltage is increased until the peak inverse voltage is reached at which time the junction breaks down. In many semiconductors this is in a fashion known as the Zener breakdown. Until breakdown is reached the layer has a high resistivity or low conductivity and is responsible for the high resistance exhibited by back-biased p-n junction rectifiers. These characteristics of a depletion layer are well known.

The semiconductor art has not, however, appreciated the nature of acoustic wave propagation through such a depletion layer when the material from which the layer is formed is also piezoelectric. Analysis in accordance with the present invention has shown that the velocity of propagation of an acoustical wave through such a medium may be expressed:

$$V=V_0\left(1+\frac{K^2}{2}\frac{1}{1+\left(\frac{\sigma}{\omega\epsilon}\right)^2}\right) \qquad (1)$$

where $v_0$ is the velocity under conditions of super conductivity, K is the electro-mechanical coupling coefficient of the piezoelectric material, $\sigma$ is the conductivity of the material, $\epsilon$ is its dielectric permitivity (dielectric constant$\times 8.85\times 10^{-14}$, the permitivity of a vacuum in farads/cm.), and $\omega$ is the angular frequency of interest. Thus, the velocity of propagation of an acoustic wave depends in a substantial way upon the electrical conductivity of the material. When the conductivity $\sigma$ is relatively large, as in low resistivity semiconductive material in portions removed from depletion layer 24, Equation 1 reduces to $$v=v_0 \qquad (2)$$

However, when the conductivity $\sigma$ is relatively small, as in the high resistivity depletion layer 24, Equation 1 reduces to $$V=V_0\left(1+\frac{K^2}{2}\right) \qquad (3)$$

A qualitative picture of why this is true may be obtained by recognizing that the variation in acoustic velocity depends upon the equivalent stiffness of the material. The greater the stiffness the greater the acoustic velocity. Stiffness, in turn, depends upon the energy required to physically deform the material. In a piezo electric material the energy required to create the piezoelectric field increases the stiffness. Thus, a material of low conductivity can support a substantial piezoelectric field, stiffness is increased, and velocity is increased. All of this is accounted for by the electro-mechanical coupling coefficient term in Equation 3. On the other hand, in a material of high conductivity the piezoelectric field is shorted out and does not affect the velocity. This accounts for the absence of electro-mechanical, coupling coefficient term in Equation 2.

Thus, the delay line of FIG. 1 includes the depletion layer section 24 of high or fast velocity $v_f$ and the normal semiconductive portions of 10 or 11 of low or slow velocity $v_s$. By varying the magnitude of the back-biased voltage by potentiometer 18 the thickness of layer 24 is varied, varying the percentage of the line length having high velocity. Thus, the change in the total delay time as a function of the change T in the thickness of the depletion layer may be expressed:

$$T\left(\frac{1}{v_f}-\frac{1}{v_s}\right) \qquad (4)$$

When switch 21 is placed in the position opposite to that shown, the back-bias becomes variable in accordance with a modulating signal from source 25 superimposed upon a suitable direct current bias 26. The modulating signal causes the boundaries 22 and 23 of depletion layer 24 to move with a velocity $v_1$, and if $v_1$ is small compared to the $v_s$, the modulating frequency may be expressed $$f=v_1\frac{(v_f-v_s)}{2v_fv_s}f_0 \qquad (5)$$

where $f_0$ is the carrier frequency. As a modulator, the device may also produce parametric amplification by proper selection of the modulating and output frequencies.

Figure 2:
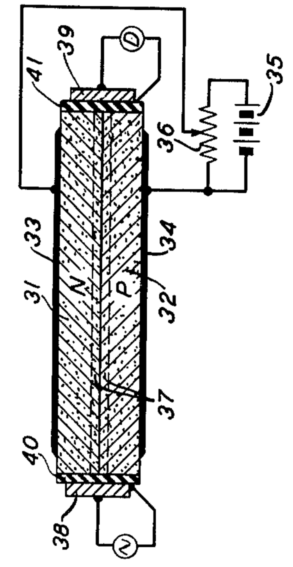
FIGS. 2 through 4 are alternative variations of ultrasonic delay lines employing longitudinally extending depletion layers.

Since the depletion layer 24 of FIG. 1 can change thickness only in limited amounts, the obtainable variation in delay is similarly limited. The delay may be increased by employing a plurality of depletion layers formed between alternate layers of n-type and p-type materials and a version of such an embodiment will be described hereinafter in connection with FIG. 5. Alternatively, a larger variation is possible by extending the depletion layer longitudinally as illustrated in FIG. 2 wherein the contacting bodies of piezoelectric, semiconductive material 31 and 32 of n and p-type, respectively, comprise elongated strips. Ohmic contacts 33 and 34 extend along substantial portions of their length to supply back-bias potential from source 35 by way of potentiometer 36. A longitudinally extending depletion layer 37 is formed along the interface. Transducers 38 and 39 are illustrated by being bonded to the respective ends of the composite delay line. In order to prevent the usually conductive back contact of transducer 38 or 39 from short-circuiting the p-n junction, electrically insulating members 40 and 41 are shown interposed between the transducers and the line.

As the thickness of depletion layer 37 is varied, it varies the acoustical thickness of the line rather than the acoustical length thereof as in the embodiment of FIG. 1. Therefore, maximum delay as well as maximum frequency dispersion is obtained when the thickness of the composite line measured normal to the depletion layer 37 is equal to or less than the wave length $\lambda_a$ of the acoustical energy to be delayed. Thus, proportioned, the velocity of propagation of energy along the line has the greatest dependence upon the acoustical thickness of the line and the velocity becomes the weighted average of the slow normal semiconductive velocity and the high depletion layer velocity.

In connection with the requirement that the minimum transverse dimension of this delay line be comparable to a wavelength of the acoustic wave, special note should be made of the group III–V compound boron phosphide. The velocity of acoustic waves in this material is almost twice as high as in the other materials being comparable to that of silicon. Therefore, the thickness of a line required to operate at a given high frequency will be twice that of the other materials, thus, easing substantially the fabrication difficulties.

Figure 3:
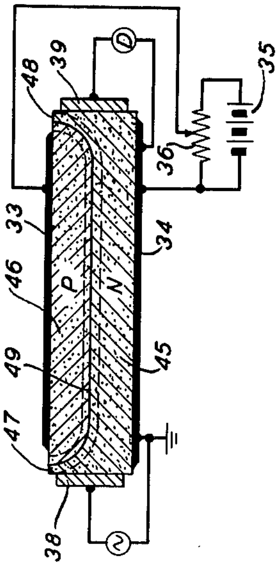

While the structure illustrated in FIG. 2 may be fabricated by any of those processes mentioned above for producing p-n junctions, a particularly suitable fabrication is illustrated in FIG. 3 utilizing the process of impurity diffusion. Referring to FIG. 3, fabrication of the composite delay line is started with a strip 45 of n-type piezoelectric semiconductive material. A suitable p-type forming impurity is then diffused into one of the faces of strip 45 to produce a p-type region 46 extending the length of strip 45 except for small end regions 47 and 48 which isolate the p-type material from transducers 38 and 39. The remaining n-type material may be grounded and may serve also as the back contact of transducers 38 and 39. The depletion layer 49 forms when the junction is back-biased and will generally be developed along a region represented by the further extent of the impurity diffusion.

Figure 4:
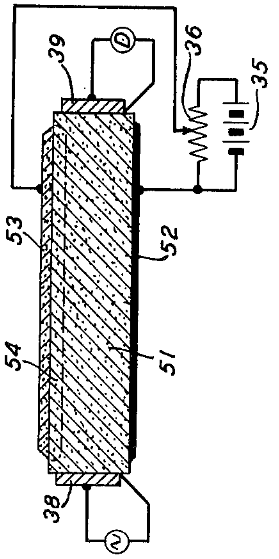

The foregoing embodiments have utilized the depletion layer formed at a p-n junction. However, a suitable depletion layer may be formed by any back-biased non-ohmic contact. In FIG. 4 strip 51 of piezoelectric semiconductive material, either n or p-type, forms the basic delay medium. One longitudinal face of strip 51 is provided with a suitable ohmic contact 52. The opposite face is provided with a suitable non-ohmic or rectifying contact 53. Alternatively, both contacts may be non-ohmic. Suitable materials which form non-ohmic contacts with the materials here contemplated are well-known. For example, gold forms a non-ohmic contact with gallium arsenide or platinum with cadmium sulfide. Depletion layer 54 will develop adjacent to the non-ohmic contact when a back-bias potential is applied across the junction. The polarity illustrated for battery 35 assumes that strip 31 is of p-type material.

In each of the preceding embodiments, the depletion layer has been formed at a non-ohmic junction. This is the general and preferred case. However, in the special case of the group II–VI compounds CdS and ZnO a high resistivity layer equivalent for the present purposes to a depletion layer will also be formed at the junction between a low resistivity n-type element of one of these materials and a high resistivity form of the source material even though the contact is ohmic. Thus, in FIG. 4, member 51 may be low resistivity n-type CdS or ZnO while contact 53 may be a thin layer of high resistivity CdS or ZnO, respectively.

As in the embodiment of FIG. 1, the delay variation obtainable in the embodiments of FIGS. 2 through 4 may be increased by employing a plurality of depletion layers formed between alternate longitudinally extending layers of n-type and p-type materials or between other alternate longitudinally extending depletion forming contacts.

Figure 5:
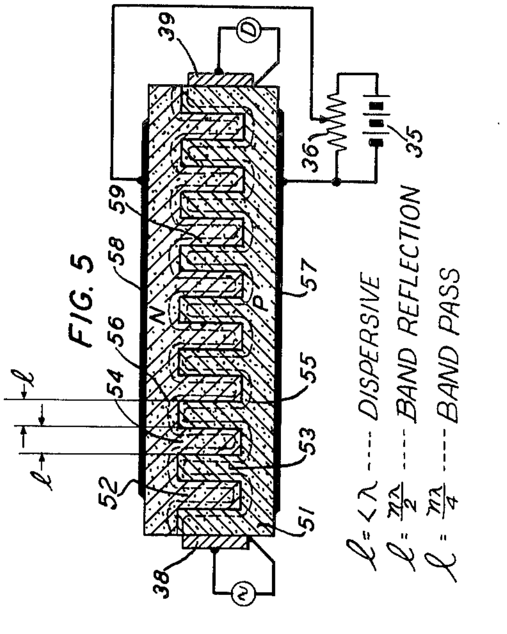
FIG. 5 is an embodiment of the invention combining features of the foregoing embodiments.

The embodiment shown in FIG. 5 combines a plurality of longitudinally extending depletion layers as shown in FIGS. 2 through 4 with a plurality of transversely extending depletion layers of FIG. 1 to afford substantial advantages over either prototype. It may be dispersive, non-dispersive, broadband, or highly frequency selective according to its proportions as will be described. As a dispersive delay line it has a substantial advantage over those of FIGS. 2 through 4 in that the latter require a minimum transverse dimension that is comparable to a wavelength of the acoustic wave. At high frequencies the resulting thinness of these lines lead to fabrication difficulties and limited power handling capacities.

Referring more particularly to FIG. 5, a preferred fabrication of this embodiment is achieved by first forming a stack of a plurality of alternate n-type and p-type layers. Suitable layers may be formed, for example, by epitaxially depositing a first n-type layer 52 upon a first p-type layer 51 and successively following with alternate p and n-type layers 53 and 54. After cutting the resulting stack to the proper size, a p-type impurity is diffused into one longitudinal face of the stack. This converts an edge portion of p-type layers 51 and 53 into p-type material and forms a longitudinally extending p-type layer 55 that couples all of the p-type layers 51 and 53 together. Similarly, an n-type impurity is diffused into the opposite face, forming an n-type layer 56 that couples n-type layers 52 and 54.

Reverse biased potential is applied by way of ohmic contacts 57 and 58 that are located upon the longitudinal p and n-type layers 55 and 56, respectively. A low conductivity depletion layer 59 develops along the serpentine path following the junction between n and p-type materials. Variation in the bias varies the thickness of depletion layer 59, which, in turn, varies the ultrasonic transmission characteristics of the device in a way that depends upon its proportions and the frequency of operation.

For example, at low frequencies for which the spacing $l$ between the transverse depletion layer sections is small compared to a wave length $\lambda$ of the acoustic energy, the structure of FIG. 5 is a non-dispersive delay line.

On the other hand, at frequencies for which the spacing $l$ between the depletion layer sections is equal to a half wavelength of the acoustic energy, successive reflections from the acoustic impedance discontinuity at the interface between each depletion layer and the adjacent low conductivity normal semiconductive material will add in phase. Thus, these frequencies are removed by reflection from the transmission band in the manner of the interference filter familiar to the optical art. If the spacing is equal to one-quarter wavelength, the reflected components will be in cancelling phase and the device will have a band pass characteristic. In either case, the sharpness of the band depends upon the degree of acoustic impedance discontinuity at each interface. The discontinuity may be controlled either by controlling the impedance difference between adjacent sections or by controlling the effect of the difference upon the propagating energy. Thus, employing materials having small piezoelectric constants reduces the impedance difference and employing materials of large piezoelectric constants increases the difference. On the other hand, if the thicknesses of the depletion layers are small compared to the thicknesses of the interposed layers of normal semiconductive material, the effect of the impedance discontinuity will be small and if the thicknesses are comparable, the effect of the discontinuity will be large. Controlled in either way, large discontinuities result in large reflections and the sharp transmission characteristic of a filter. The resulting filter is electrically tunable by adjusting the direct-current bias. When the impedance discontinuity is small, the structure becomes a dispersive delay line and the amount of delay is controlled by adjusting the direct-current bias.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In combination, an ultrasonic wave transmission medium having at least a portion of its length formed of semiconductive material having piezoelectric properties when in high resistivity form but having sufficient mobile charge carriers to have low resistivity, means including means for applying a bias potential to said material for depleting a portion of said material of said charge carriers to increase the resistivity of said portion to a value for which a significant piezoelectric field can be supported in said portion thereby increasing the velocity of propagation of said ultrasonic waves through said portion, and means for applying ultrasonic waves to said medium directed therein through said portion and for utilizing said waves after being modified in velocity as a result of propagation through said portion.

2. The combination according to claim 1 wherein said means for applying a bias potential includes means for producing a non-ohmic contact with said material.

3. The combination according to claim 1 wherein said means for applying a bias potential includes a second member of high resistivity semiconductive material contacting said first named member.

4. An ultrasonic wave transmission device comprising a pair of transducer means for converting electrical energy to and from ultrasonic mechanical vibrations, a wave transmission medium connecting said transducers, said medium having at least a portion of its length formed of semiconductive material having piezoelectric properties when in high resistivity form but having sufficient mobile charge carriers to have low resistivity, means including means for applying a bias potential to said material for depleting a portion of said material of said charge carriers to increase the resistivity of said portion to a value for which a significant piezoelectric field can be supported in said portion thereby increasing the velocity of propagation of said ultrasonic waves through said portion.

5. An ultrasonic device comprising a pair of transducer means for converting electrical energy to and from ultasonic mechanical vibrations, a vibration transmission path including at least one semiconductive p-n junction connecting said transducers, at least part of said junction being formed of a material which has piezoelectric properties when depleted of mobile charge carriers, and means for applying a direct-current potential across said junction to form a depletion layer of thickness that varies the velocity of propagation of said vibrations along said path.

6. A device according to claim 5 wherein said p-n junction is formed between a member of p-type, piezoelectric, semiconductive material comprising a portion of said path and a member of n-type, piezoelectric, semiconductive material comprising the succeeding portion of said path.

7. A device according to claim 5 wherein said p-n junction is formed between coextensive portions of a member of p-type, piezoelectric, semiconductive material and a member of n-type, piezoelectric, semiconductive material.

8. The device according to claim 7 wherein said coextensive portions have a combined dimension measured normal to said junction that is no greater than the wavelength of said ultrasonic vibrations.

9. The device according to claim 7 wherein said direct-current potential is applied with the negative side thereof connected to said p-type member.

10. The device according to claim 5 wherein a portion of said path is formed of a plurality of alternate layers of n and p-types of semiconductive material having piezoelectric properties when in high resistivity form, and wherein the positive terminal of said direct current potential is applied to each of said layers of n-type material and the negative terminal of said direct current potential is applied to each of said layers of p-type material.

References Cited by the Examiner

UNITED STATES PATENTS

| | | | |
|---|---|---|---|
| 2,553,491 | 5/51 | Shockley | 333—72 |
| 2,837,704 | 6/58 | Emeis | 317—235 |
| 2,866,014 | 12/58 | Burns | 333—72 |
| 2,889,499 | 6/59 | Rutz | 307—88.511 |
| 2,898,477 | 8/59 | Hoesterey | 333—72 |
| 2,904,704 | 9/59 | Marmace | 307—88.511 |
| 3,093,758 | 6/63 | Hutson | 310—8 |

OTHER REFERENCES

McCue, Lincoln Labs. MIT Tech. Report No. 179, Apr. 15, 1958.

Hoger, Electronics, Sept. 4, 1959, vol. 32, No. 36, pages 44–49.

HERMAN KARL SAALBACH, *Primary Examiner.*